United States Patent
Yokokawa (10) Patent No.: US 12,427,989 B2
(45) Date of Patent: Sep. 30, 2025

(54) VEHICLE CONTROL DEVICE, VEHICLE CONTROL METHOD AND PROGRAM

(71) Applicant: TOYOTA JIDOSHA KABUSHIKI KAISHA, Toyota (JP)

(72) Inventor: Hidehito Yokokawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 18/627,551

(22) Filed: Apr. 5, 2024

(65) Prior Publication Data
US 2024/0336265 A1 Oct. 10, 2024

(30) Foreign Application Priority Data
Apr. 5, 2023 (JP) .................. 2023-061184

(51) Int. Cl.
*B60W 30/18* (2012.01)
*B60W 30/14* (2006.01)

(52) U.S. Cl.
CPC .... *B60W 30/18163* (2013.01); *B60W 30/143* (2013.01); *B60W 2520/10* (2013.01); *B60W 2554/802* (2020.02)

(58) Field of Classification Search
CPC ......... B60W 30/18163; B60W 30/143; B60W 30/0956; B60W 2520/10; B60W 2554/802
See application file for complete search history.

(56) References Cited

U.S. PATENT DOCUMENTS

| | | | |
|---|---|---|---|
| 10,793,147 B2 | 10/2020 | Kaminade et al. | |
| 10,870,349 B2 | 12/2020 | Uejima | |
| 10,953,883 B2 | 3/2021 | Sakaguchi | |
| 10,981,569 B2 | 4/2021 | Hashimoto et al. | |
| 11,014,563 B2 | 5/2021 | Hashimoto et al. | |
| 11,072,334 B2 | 7/2021 | Aoki et al. | |
| 11,267,473 B2 | 3/2022 | Takahashi | |
| 11,279,360 B2 | 3/2022 | Fukuda et al. | |
| 2020/0070889 A1 | 3/2020 | Fukuda et al. | |
| 2020/0247400 A1 | 8/2020 | Fujii | |
| 2023/0031030 A1* | 2/2023 | Park .................. | B60W 60/001 |
| 2023/0286583 A1* | 9/2023 | Uemura ............ | B62D 15/0255 |

(Continued)

FOREIGN PATENT DOCUMENTS

| | | |
|---|---|---|
| JP | 2017-097495 A | 6/2017 |
| JP | 2017-100657 A | 6/2017 |

(Continued)

*Primary Examiner* — George C Jin
(74) *Attorney, Agent, or Firm* — Oliff PLC (57) ABSTRACT

To effectively prevent the traveling of the rear vehicles from being interfered by LCA of the own vehicle, provided is a vehicle control device configured to execute a lane change assist control for automatically changing a lane from a lane traveling on a own vehicle to a target lane adjacent to the lane. The vehicle control device is configured to obtain a relative distance and a relative speed between the own vehicle and a rear vehicle traveling behind the one vehicle, and shorten the time from the establishment of the specific condition for permitting the execution of the lane change assist control to the start of the lane change, when the relative distance is shorter and/or a speed of the rear vehicle is higher than a speed of the own vehicle and the relative speed is larger.

5 Claims, 6 Drawing Sheets

(56) References Cited

U.S. PATENT DOCUMENTS

2023/0311892 A1* 10/2023 Kato ............... B60W 30/18163
                                                701/26
2023/0322231 A1* 10/2023 Nishiguchi ......... B60W 40/072
                                                701/23

FOREIGN PATENT DOCUMENTS

JP          2019-159541 A      9/2019
JP          2020-035100 A      3/2020

* cited by examiner

VEHICLE CONTROL DEVICE, VEHICLE CONTROL METHOD AND PROGRAM

CROSS-REFERENCE TO RELATED APPLICATION

This application claims priority to Japanese Patent Application No. JP2023-061184 filed on Apr. 5, 2023, the content of which is hereby incorporated by reference in its entirety into this application.

BACKGROUND OF THE INVENTION

1. Field of the Invention

The present disclosure relates to a vehicle control device, a vehicle control method and a program.

2. Description of the Related Art

There is known a control device for a vehicle that performs lane change assist control (LCA), which automatically changes the vehicle from the lane in which it is traveling to an adjacent target lane (For example, refer to Japanese Patent Application Laid-Open (kokai) No. 2017-097495).

Generally, lane changes (lateral direction movements) by LCA are started when a definite period of time has elapsed since the driver's support-request operation is made to be a starting point and the execution-permission conditions of LCA is satisfied. However, when the lane change is started at a timing at which the definite period of time has elapsed, for example, in a scene in which another vehicle (hereinafter, also referred to as a rear vehicle) at a rear side traveling on the target lane of the lane change destination approaches the own vehicle, the traveling of the rear vehicle may be interfered. Specifically, after the lane change of the own vehicle, the distance between the own vehicle and the rear vehicle is shortened, thereby forcing the rear vehicle to decelerate.

SUMMARY OF THE INVENTION

It is an object of the present disclosure to effectively prevent the traveling of the rear vehicles from being interfered by LCA of the own vehicle.

A device according to at least one embodiment of the present disclosure is a vehicle control device configured to execute a lane change assist control for automatically changing a lane from a lane traveling on a own vehicle to a target lane adjacent to the lane. The vehicle control device is configured to obtain a relative distance and a relative speed between the own vehicle and a rear vehicle traveling behind the one vehicle, and shorten the time from the establishment of the specific condition for permitting the execution of the lane change assist control to the start of the lane change, when the relative distance is shorter and/or a speed of the rear vehicle is higher than a speed of the own vehicle and the relative speed is larger.

DESCRIPTION OF THE EMBODIMENTS

Description is now given of a vehicle control device, a vehicle control method and a program according to at least one embodiment of the present disclosure with reference to the drawings.

[Hardware Configuration]

Figure 1:
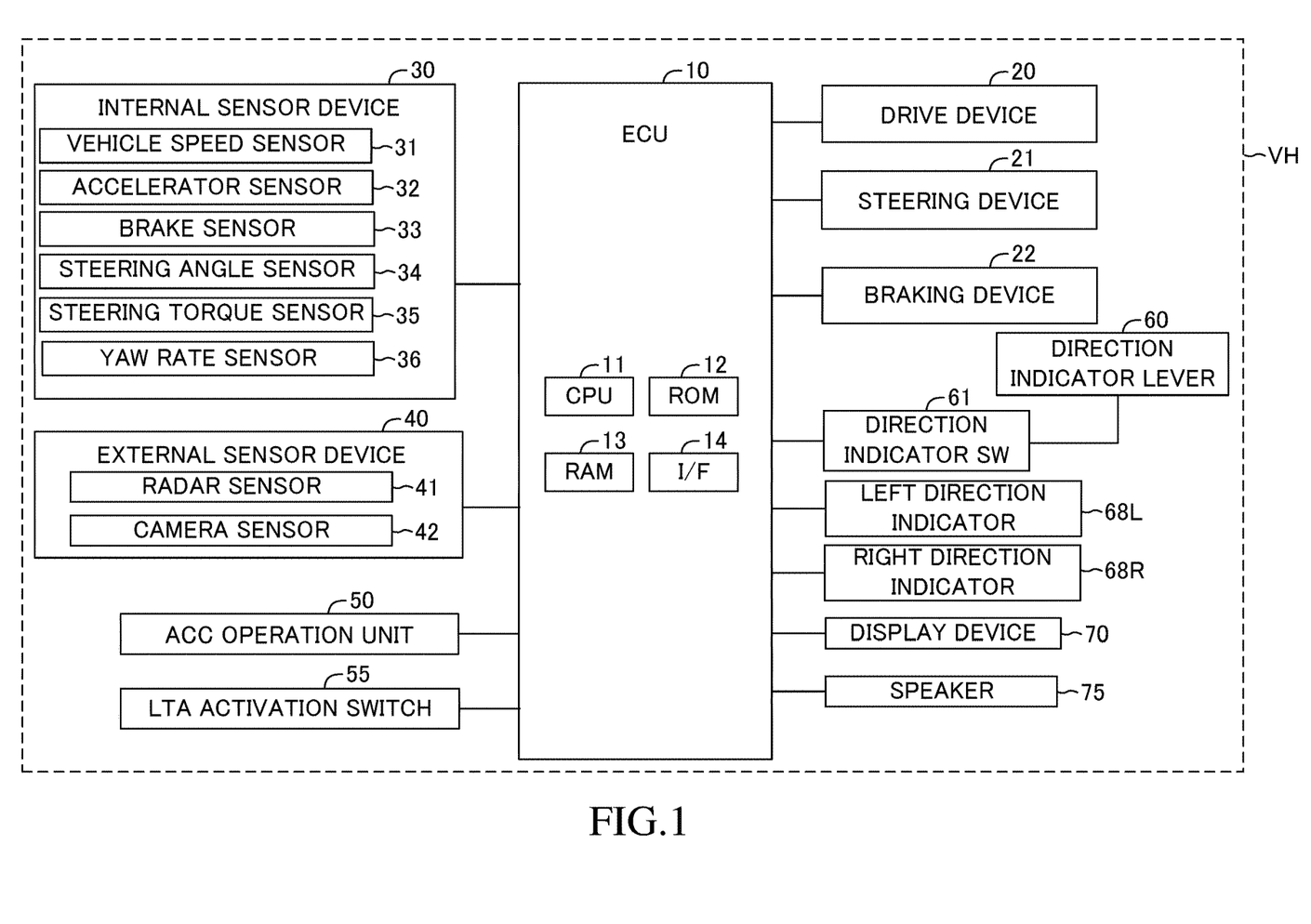
FIG. 1 is a schematic diagram showing a hardware configuration of a vehicle according to the present embodiment.

FIG. 1 is a schematic diagram of a hardware configuration of a vehicle VH to which the control device according to the present embodiment is applied. Hereinafter, the vehicle VH may be referred to as an own vehicle when it is required to distinguish it from other vehicles.

The vehicle VH has an ECU (Electronic Control Unit) 10. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes driving assist control of the vehicle VH, such as LCA, an adaptive cruise control (ACC), a lane trace assist (LTA), and the like. The driving assist control is a concept which encompasses automatic driving control. A drive device 20, a steering device 21, a braking device 22, an internal sensor device 30, an external sensor device 40, a ACC operating unit 50, a LTA activation switch 55, a direction indicator switch 61, a direction indicator 68L, 68R, a display device 70, a speaker 75, and the like are communicably connected to the ECU 10.

The drive device 20 generates a driving force to be transmitted to driving wheels of the vehicle VH. As the drive device 20, for example, an engine and a motor are given. In the device according to the at least one embodiment, the vehicle VH may be any one of a hybrid electric vehicle (HEV), a plug-in hybrid electric vehicle (PHEV), a fuel cell electric vehicle (FCEV), a battery electric vehicle (BEV), and an engine vehicle. The steering device 21 applies steering forces to steerable wheels of the vehicle VH. The braking device 22 applies a braking force to the wheels of the vehicle VH.

The internal sensor device 30 is sensors which acquire states of the vehicle VH. Specifically, the internal sensor device 30 includes a vehicle speed sensor 31, an accelerator sensor 32, a brake sensor 33, a steering angle sensor 34, a steering torque sensor 35, a yaw rate sensor 36, and the like. The vehicle speed sensor 31 detects a travel speed (vehicle speed v) of the vehicle VH. The accelerator sensor 32 detects an operation amount of an accelerator pedal (not shown) by the driver. The brake sensor 33 detects an operation amount of a brake pedal (not shown) by the driver. The steering angle sensor 34 detects a rotational angle of a steering wheel or a steering shaft (not shown) of the vehicle VH, that is, a steering angle. The steering torque sensor 35 detects a rotational torque of a steering wheel or a steering shaft (not shown) of the vehicle VH, that is, a steering torque. The yaw rate sensor 36 detects a yaw rate of the vehicle VH. The internal sensor device 30 transmits the condition of the vehicle VH detected by the sensors 31 to 36 to the ECU 10 at a predetermined cycle.

The external sensor device 40 is sensors which acquire object information on objects around the vehicle VH. Specifically, the periphery recognition device 40 includes a radar sensor 41, a camera sensor 42, and the like. As the object information, there are given, for example, a peripheral vehicle, a traffic light, a white line of a road, a traffic sign, a fallen object, and the like.

The radar sensor 41 is provided in, for example, a front portion of the vehicle VH, and detects a target existing in a region located on the front side of the vehicle VH. The radar sensor 41 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires a relative distance between the vehicle VH and the target, a relative speed between the vehicle VH and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the vehicle VH, the relative distance between the vehicle VH and the target, the relative speed between the vehicle VH and the target, and the like.

The camera sensor 42 is, for example, a stereo camera or a monocular camera, and a digital camera including an image pickup element such as a CMOS sensor or a CCD sensor can be used as the camera sensor 42. The camera sensor 42 is arranged in, for example, a top portion of a front windshield glass of the vehicle VH. The camera sensor 42 captures a region in front of the vehicle VH, and processes captured image data, to thereby obtain the object information in front of the vehicle VH. The object information is information indicating a type of the target detected in front of the vehicle VH, the relative distance between the vehicle VH and the target, the relative speed between the vehicle VH and the target, and the like. It is only required to recognize the type of the target through, for example, machine learning such as pattern matching.

The external sensor device 40 repeatedly transmit the acquired object information to the ECU 10 each time a predetermined time elapses. The ECU 10 composes the relative relationship between the vehicle VH and the target acquired by the radar sensor 41 and the relative relationship between the vehicle VH and the target acquired by the camera sensor 42, to thereby determine a relative relationship between the vehicle VH and the target. It is not always required for the external sensor device 40 to include both of the radar sensor 41 and the camera sensor 42, and may include, for example, only the radar sensor 41 or only the camera sensor 42.

The ACC operating unit 50 includes, for example, a start switch for selecting whether to start or end ACC, a setting switch for setting a target vehicle speed and a target inter-vehicle distance of the ACC, a cancel switch for temporarily canceling the ACC being executed, a resume switch for resuming the ACC, and the like. The LTA activation switch 55 is ON/OFF switch for selecting by the driver whether the activating or terminating the LTA.

The direction indicator lever 60 is an operating device for causing by the drivers to blink the left and right direction indicator 68L, 68R. The direction indicator switch 61 detects an operation direction of the direction indicator lever 60 by the driver. When the driver operates the direction indicator lever 60 by a predetermined amount (for example, deep), the direction indicator switch 61 transmits a blinking instruction signal corresponding to the operation direction to the ECU 10. When the ECU 10 receives the blinking instruction signal, it causes the direction indicator 68L, 68R corresponding to the operating direction of the direction indicator lever 60 to blink.

The turn signal lever 60 is also used by the driver as an operating device for requiring to change the lane by LCA. Specifically, when the driver operates and holds the direction indicator lever 60 by a predetermined amount (for example, shallow), the direction indicator switch 61 transmits, to the ECU 10, a LCA request signal indicating that the driver requests a lane change to an adjoining lane (target lane) in the operation direction of the direction indicator lever 60, together with a blink instruction signal corresponding to the operation direction.

The display device 70 is, for example, a multi-information display, a head-up display, a display of a navigation system, or the like, and displays various images in accordance with a command from the ECU 10. The speaker 75 is, for example, a speaker of an audio system or a navigation system, and outputs a warning sound or the like in response to a command from the ECU 10.

[Software Configuration]

Figure 2A:
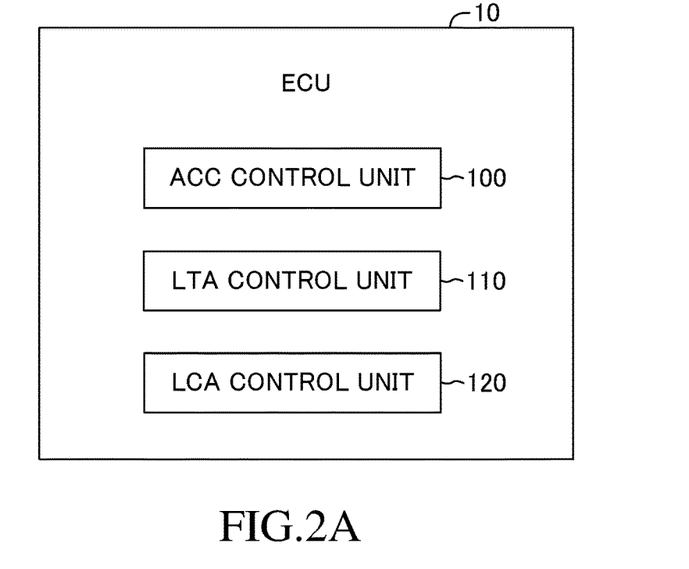
FIG. 2A is a schematic diagram showing a software configuration of a control device to the present embodiment.

FIG. 2A is a schematic diagram showing a software configuration of the ECU 10 to the present embodiment. As shown in FIG. 2A, the ECU 10 includes an ACC control unit 100, a LTA control unit 110, a LCA control unit 120, and the like as a part of functional elements. Those functional elements 100 to 120 are realized by the CPU 11 of the ECU 10 reading a program stored in the ROM 12 into the RAM 13 and executing the program. Note that all or a part of the functional elements 100 to 120 may be provided in another ECU separate from the ECU 10 or in an information processing device of a facility (a control center or the like) capable of communicating with the vehicle VH.

The ACC control unit 100 executes the ACC based on the target vehicle speed and the target inter-vehicle distance. The ACC itself is well known. Thus, a brief description is now given of the ACC. The ACC includes two types of control, namely, the constant-speed travel control and the follow-up travel control. The constant-speed travel control is control of causing the vehicle VH to travel at a constant speed in accordance with the target vehicle speed without requiring the accelerator operation of the driver. The follow-up travel control is control of causing the vehicle VH to travel such that the vehicle VH follows a preceding vehicle while maintaining the inter-vehicle distance to the preceding vehicle at the target inter-vehicle distance. The preceding vehicle is a vehicle traveling in front of the vehicle VH.

When the ACC activation switch of the ACC operation unit 50 is turned ON, the ACC control unit 100 determines whether or not there is a preceding vehicle to be followed on the basis of the object information transmitted from the external sensor device 40. When determining that the preceding vehicles do not exist, the ACC control unit 100 executes constant speed travel control. In this case, the ACC control unit 100 calculates the target acceleration from the deviation between the actual vehicle speed v and the target vehicle speed, and controls the operation of the drive device 20 and the braking device 22 based on the calculated target acceleration. The actual vehicle speed v may be acquired based on the detection result of the vehicle speed sensor 31. On the other hand, when it is determined that the preceding vehicles exist, the ACC control unit 100 executes the follow-up travel control. In this case, the ACC control unit 100 calculates the target acceleration from the deviation between the actual inter-vehicle distance and the target inter-vehicle distance, and controls the operation of the drive device 20 and the braking device 22 based on the calculated target acceleration. The actual inter-vehicle distance between the own vehicle VH and the preceding vehicle may be acquired based on the detection result of the external sensor device 40.

The LTA control unit 110 executes the LTA for automatically changing the steering angle (steered wheel turning angle) so that a lateral position of the own vehicle VH is maintained in the vicinity of the target traveling lane. Here, the lateral position of the own vehicle VH is a position (for example, a center of gravity position) of the own vehicle VH in the lane-width direction with respect to the road. The LTA itself is well known. Thus, a brief description is now given of the LTA. When the LTA activation switch 65 is turned ON while ACC is being performed by the ACC control unit 100, the LTA control unit 110 sets the target traveling line of the vehicle VH on the basis of either one or both of the white line recognized by the external sensor device 40 or the traveling trajectory of the following target vehicle (that is, the preceding vehicle) by ACC. The traveling trajectory of the following target vehicle may be acquired based on the object information transmitted from the external sensor device 40. The LTA control unit 110 changes the steering angle of the vehicle VH by controlling the operation of the steering device 21 so that the lateral position of the vehicle VH is maintained near the target traveling line in the traveling lane.

The LCA control unit 120 executes the LCA of controlling the operation of the driving device 20, the steering device 21, and the braking device 22 so as to move from the lane (hereinafter, the original lane) where the own vehicle VH is currently traveling to the lane (hereinafter, the target lane) adjacent to the original lane, and assisting the steering operation of the drivers. The LCA itself is well known. Thus, a brief description is now given of the LCA. The LCA is to be executed on behalf of the LTA in the same way as the own vehicle VH in the control of the lateral position relative to the lane, when a request for assistance from the drivers is received during the execution of the LTA and the ACC. For example, the LCA control unit 120 executes the LCA when the following execution-permission conditions are satisfied.

(1). Receiving the LCA request signal from the turn signal switch 61.
(2). Both the ACC start switch and the LTA start switch 55 are turned ON.
(3). The white line, which is the boundary between the original lane and the target lane, is a broken line.
(4). The external sensor device 40 does not detect an obstacle such as another vehicle that obstructs lane change in the target lane.
(5). The vehicle speed v of the own vehicle VH is within the specified allowable speed range.

Note that the execution-permission conditions (1) to (5) are examples and may not include some conditions, or may further include other conditions (for example, a type of a road such as an automobile dedicated road).

The LCA control unit 120 determines that the condition for starting the lane change (lateral movement) is satisfied when the state in which all the execution-permission conditions (1) to (5) are continuously satisfied predetermined standard thresholds time Tv. When the start condition is satisfied, the LCA control unit 120 transmits a LCA start guidance display command to the display device 70. As a result, the LCA starting guidance is displayed on the display device 70.

Figure 2B:
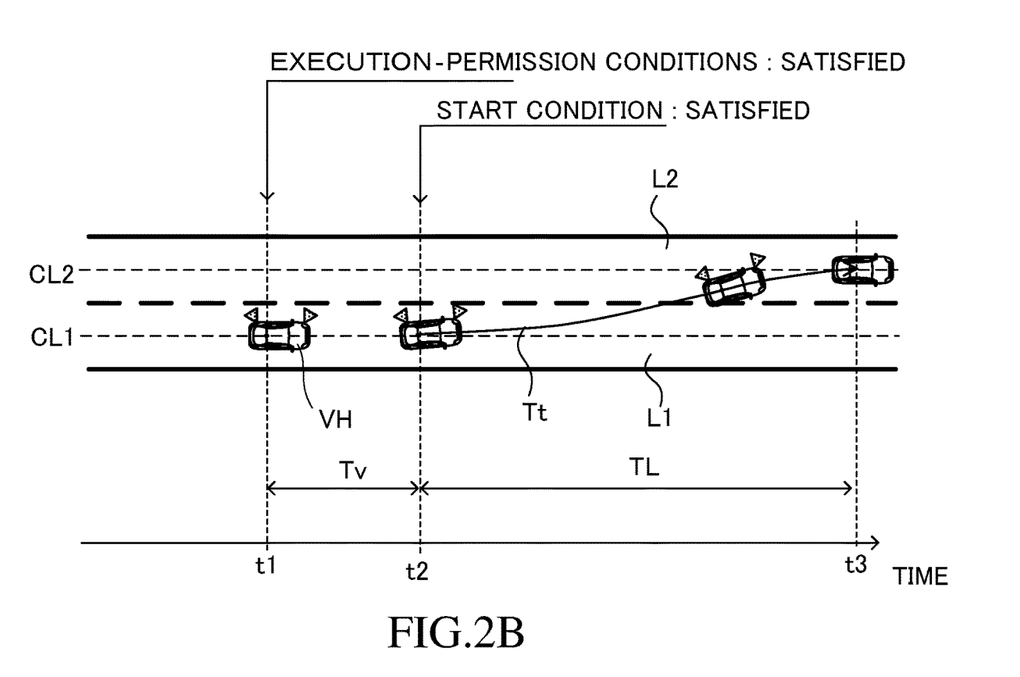
FIG. 2B is a schematic diagram showing an example of the target trajectory of LCA.

The LCA control unit 120 calculates a target trajectory that determines a target trajectory of the own vehicle VH. The target trajectory Tt is, for example, a shape as shown in FIG. 2B, and is a trajectory for moving the own vehicle VH from the original lane L1 to the widthwise center position CL2 (hereinafter, the final target lateral position) of the target lane L2 over the target lane change time TL. Note that the time t1 to t2 in FIG. 2B indicates a time period in which all of the execution-permission conditions (1) to (5) are satisfied. The target trajectory function is a function for calculating the target lateral position y, the target lateral velocity vy, and the target lateral acceleration ay of the own vehicle VH corresponding to the elapsed time from the starting point of the lane change (that is, the time t2 at which the start condition is satisfied) with reference to the lane center line CL1 of the original lane L1. The target lane change time LT is set based on the target lateral distance required to move the own vehicle VH lateral direction from the starting position of the lane change to the final target lateral position CL2.

The LCA control unit 120 calculates the target lateral position y, the target lateral velocity vy, and the target lateral acceleration ay at the current time point on the basis of the target trajectory function and the elapsed time when the lane change starting condition is satisfied at the time t2 with the elapse of the standard thresholds time Tv. Further, the LCA control unit 120 calculates the target yaw angle θy, the target yaw rate γ, and the target curvature Cu at the current time point based on the vehicle speed v, the target lateral speed vy, and the target lateral acceleration ay at the current time point, and calculates the target steering angle θ based on the target lateral position y, the target yaw angle θy, the target yaw rate γ, and the target curvature Cu. Then, the LCA control unit 120 controls the operation of the steering device 21 based on the target steering angle θ, thereby changes the steering angle of the own vehicle VH. As shown in the time t3 of FIG. 2B, the LCA control unit 120 transmits a LCA termination guidance display command to the display device 70 while terminating the own vehicle VH when it reaches the final target lateral position CL2 of the target lane L2. As a result, the LCA end guidance is displayed on the display device 70.

When the following cancellation conditions (1) to (5) are satisfied while the LCA is being executed, the LCA control unit 120 cancel the LCA being executed.

(1). The input of the steering torque exceeding the specified value by the driver operation is detected.
(2). The brake operation by the driver is detected.
(3). When the LCA is canceled by operating the turn signal lever 60.

(4). The white line, which is the boundary between the original lane and the target lane, is no longer a broken line.

(5). Other vehicles traveling in the target lane have come close to the own vehicle VH, and it is not possible to secure a safety distance between those vehicles.

When at least one of the cancellation conditions (1) to (5) is satisfied, the LCA control unit 120 cancel the LCA being executed. When the cancellation conditions of LCA is satisfied, the LCA control unit 120 transmits a LCA cancel guidance display command to the display device 70. As a result, a LCA cancel guidance is displayed on the display device 70.

Figure 3A:
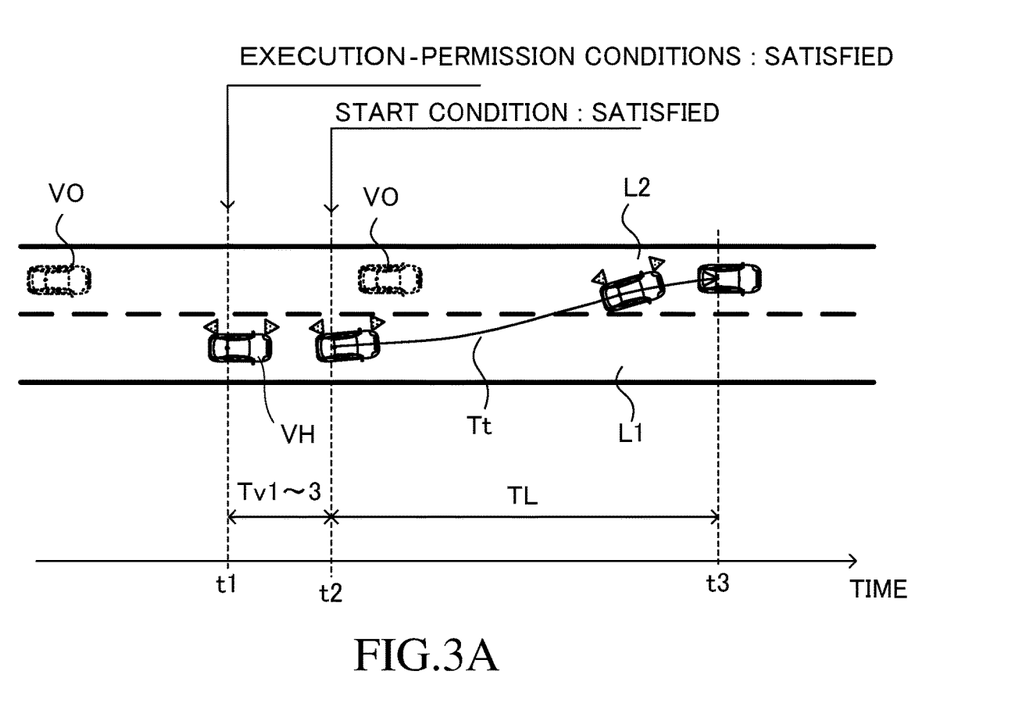
FIG. 3A is a schematic diagram for explaining the present embodiment executing an interference prevention control.
Figure 3B:
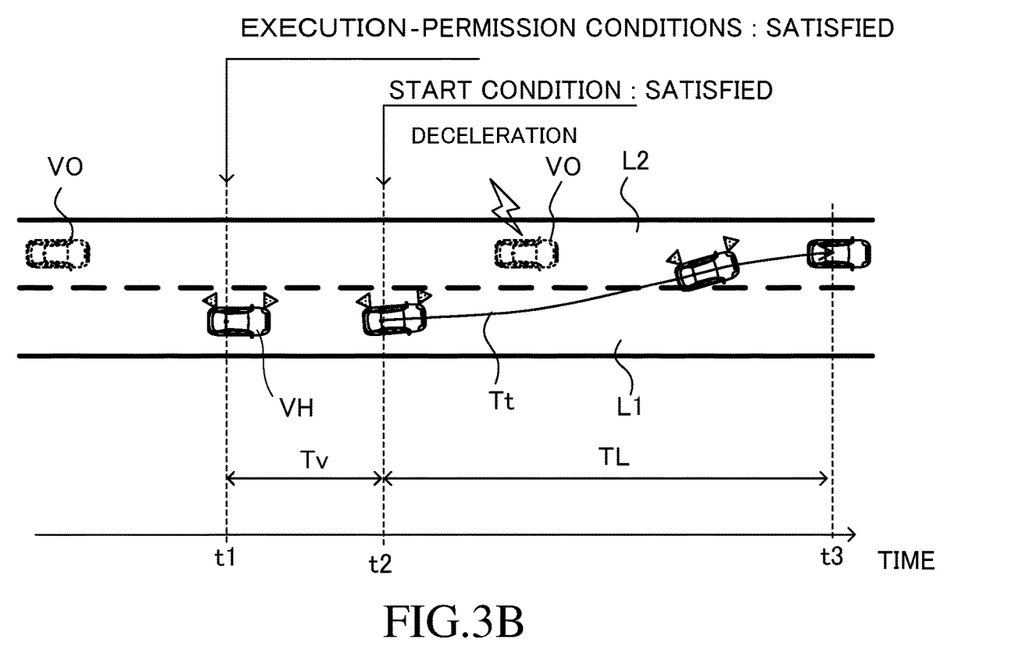
FIG. 3B is a schematic diagram for explaining a comparative example in which the interference prevention control is not executed.

Here, as shown in FIG. 3B, assuming when the own vehicle VH changing the lane from the original lane L1 to the target lane L2 by LCA in a situation where the other vehicle VO traveling in the target lane L2 approaches the own vehicle VH from the rear side. Hereinafter, the other vehicle VO approaching from the rear is referred to as a "rear vehicle".

As described above, the lane change by LCA is started when the standard thresholds time Tv continues in a condition in which all of the execution-permission conditions (1) to (5) are satisfied (see the time t1 to t2 in FIG. 3B). Specifically, since the inter-vehicle distance to the rear vehicle VO cannot be sufficiently secured during lane change to the target lane L2 of the own vehicle VH or after the lane change is completed (see the time t3 in FIG. 3B), the driver of the rear vehicle VO is forced to perform braking (if the rear vehicle VO is executing ACC, deceleration by the following travel control).

Therefore, when the rear vehicle VO traveling in the target lane L2 approaches the own vehicle VH, the LCA control unit 120 of the present embodiment executes an interference prevention control for preventing the interfering of the travel of the rear vehicle VO by changing the starting timing of the lane change and the target lateral velocity vy (or the target lane change time TL). Details of the interference prevention control will be described below.

Figure 4:
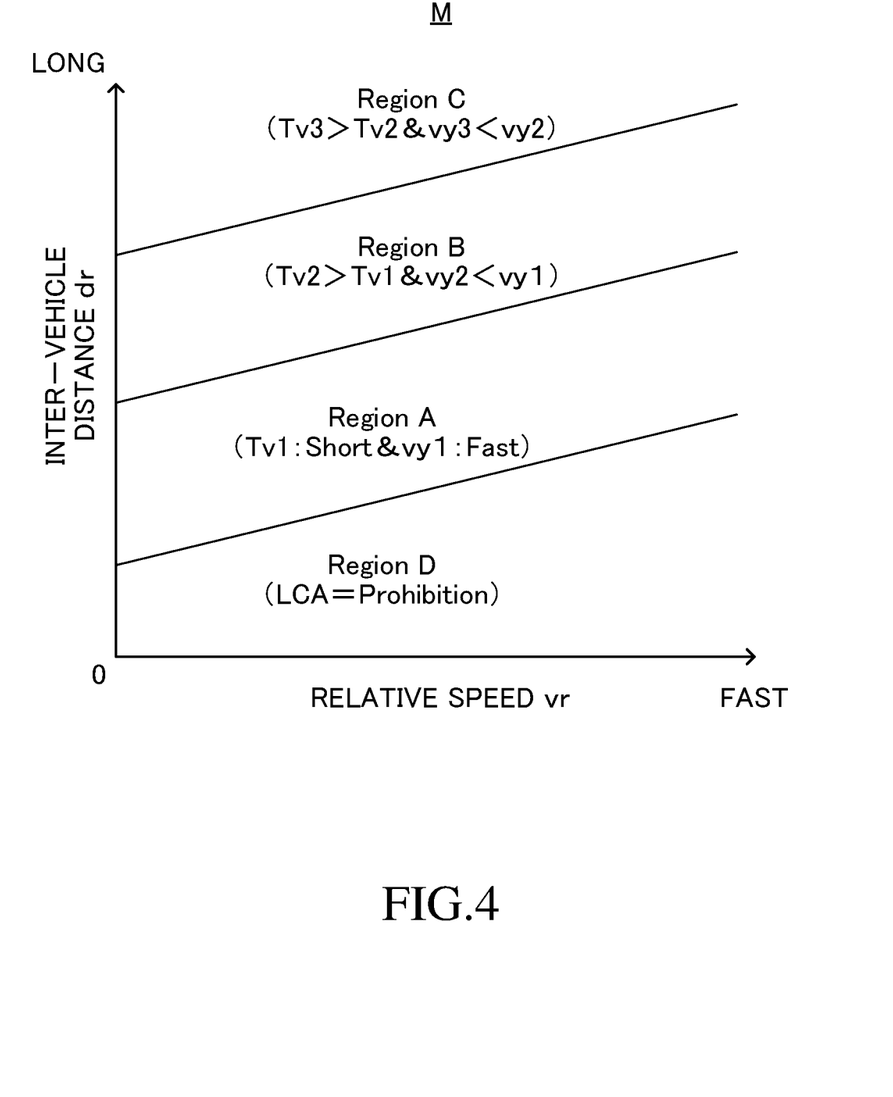
FIG. 4 is a schematic diagram showing an example of a switching map according to the present embodiment.

FIG. 4 is a schematic diagram showing an example of a switching map M according to the present embodiment. The switching map M is a map for switching the starting timing of the lane change by LCA and the target lateral velocity vy, and is stored in advance in the ROM 12 of the ECU 10. In the switching map M, the inter-vehicle distance dr between the own vehicle VH and the rear vehicle VO and the starting timing and the lateral speed of the lane change that changes in accordance with the relative speed vr are defined. Here, the relative speed vr is a value obtained by subtracting the vehicle speed v of the own vehicle VH from the vehicle speed V0 of the rear vehicle v2 when the vehicle speed v of the own vehicle VH is slower than the vehicle speed v2 of the rear vehicle VO (vr=v2−v).

In the embodiment illustrated in FIG. 4, the horizontal axis of the switching map M represents the relative velocity vr, and the vertical axis represents the inter-vehicle distance dr. A plurality of regions A to D are provided in the switching map M. Notes, the number of regions is not limited to 4 in the illustrated example, and may be 2 or 3, or may be 5 or more. Further, the horizontal axis and the vertical axis may be replaced. In addition, although the boundaries of the respective regions A to D are indicated by straight lines, the boundaries may be curved.

The region D is a region in which inter-vehicle distance dr is short even if the relative speed vr is relatively small or the relative speed vr is large even if the inter-vehicle distance dr is relatively long. The region D corresponds to the case when the execution-permission condition (4) is not satisfied.

The region A is a region in which the relative speed vr is small even if the inter-vehicle distance dr is same as the region D. In other words, the region A is a region where the inter-vehicle distance dr is long even if the relative speed vr is same as the region D. That is, the region A is a region that prevents the rear vehicle VO from traveling unless the lane change is started early or the lateral velocity during the lane change is increased. In the region A, the starting timing is set at a first threshold time Tv1 shorter than the standard thresholds time e Tv (Tv>Tv1). Further, in the region A, the lateral velocity is set at a first lateral velocity vy1 higher than the target lateral velocity vy (vy<vy1).

The region B is a region in which the relative speed vr is small even if the inter-vehicle distance dr is same as the region A. In other words, the region B is a region where the inter-vehicle distance dr is long even if the relative speed vr is same as the region A. That is, the region B is a region that is not as severe as the region A, but prevents the rear-vehicle VO from traveling unless the lane change is started earlier or the lateral velocity during the lane change is increased. In the region B, the starting timing is set at a second threshold time Tv2 shorter than the standard threshold time Tv and longer than the first threshold time Tv1 (Tv>Tv2>Tv1). In addition, in the region B, the lateral speed is set at a second lateral speed vy2 that is faster than the target lateral speed vy and slower than the first lateral speed vy1 (vy<vy2<vy1).

The region C is a region in which the relative speed vr is small even if the inter-vehicle distance dr is same as the region A and the region B. In other words, the region C is a region where the inter-vehicle distance dr is long even if the relative speed vr is same as the region A and the region B. That is, the region C is a region in which the lane change does not need to be started as soon as the region A or the region B, and the lateral speed during the lane change does not need to be as fast as the region A or the region B. In the region C, the starting timing is set at a second threshold time Tv2 that is shorter than the standard threshold time Tv and longer than the second threshold time Tv2 (Tv>Tv3>Tv2>Tv1). In addition, in the region C, the lateral speed is set at a third lateral speed vy3 that is faster than the target lateral speed vy and slower than the second lateral speed vy2 (vy<vy3<vy2<vy1).

The LCA control unit 120 detects the rear-vehicle VO traveling in the target lane L2 based on the detection result of the external sensor device 40 when all the execution-permission conditions (1) to (5) of LCA are satisfied. The LCA control unit 120, when there is no rear-vehicle VO, starts lane change based on the standard thresholds time Tv and executes LCA based on the target lateral velocity vy. On the other hand, when the rear vehicle VO is present, the LCA control unit 120 sets the threshold time Tv1 to Tv3 for determining the beginning of the lane change and the lateral speed vy1 to vy3 during the lane change by referring to the switching map M based on the relative speed vr with the rear vehicle VO and the inter-vehicle distance dr acquired from the detection result of the external sensor device 40.

That is, as shown in FIG. 3A, when the rear vehicle VO is present, the starting timing of the lane change by LCA is advanced (see the time t1 to t2) and the lateral velocity during the lane change is further increased (see the time t2 to t3) as compared with the case of FIG. 2B where the rear vehicle VO is not present. Thus, after the lane change of the own vehicle VH, the inter-vehicle distance dr with the rear-vehicle VO is sufficiently secured (refer to the time t3). Consequently, it is possible to effectively prevent the traveling of the rear vehicle VO from being interfered by the lane change of the own vehicle VH such as forcing the deceleration in the rear vehicle VO. In addition, since the lateral velocity during the lane change is increased, the cancellation condition (5) can be effectively suppressed from being satisfied during LCA.

Next, a routine of LCA process by the CPU 11 of the ECU 10 will be described with reference to FIG. 5. This routine is started, for example, when ACC and LTA are activated.

In step S100, the ECU 10 determines whether or not LCA requesting signal has been received from the turn indicator switch 61, that is, whether or not LCA execution-permitted condition (1) is satisfied. When the LCA execution-permission condition (1) is satisfied (Yes), the ECU 10 advances the process to step S110. On the other hand, if the LCA execution-permission condition (1) is not satisfied (No), the ECU 10 returns to this routine.

In step S110, the ECU 10 determines whether or not LCA execution-permitted conditions (2) to (5) are satisfied. When the LCA execution-permission conditions (2) to (5) are satisfied (Yes), the ECU 10 advances the process to step S120. On the other hand, if the LCA execution-permission conditions (2) to (5) are not satisfied (No), the ECU 10 returns to this routine.

In step S120, the ECU 10 determines whether or not there is the rear vehicle VO traveling in the target lane L2 based on the detection result of the external sensor device 40. When the rear vehicle VO exist (Yes), the ECU 10 advances the process to step S130. On the other hand, if the rear vehicle VO does not exist (No), the ECU 10 advances the process to step S180.

In step S180, the ECU 10 determines whether or not all of the LCA execution-permitted conditions (1) to (5) are satisfied and continue for the standard thresholds time Tv. When the execution-permission conditions (1) to (5) continue the standard thresholds time Tv (Yes), the ECU 10 advances the process to step S182. On the other hand, if at least one of the execution-permitted conditions (1) to (5) is not satisfied prior to the elapse of the standard thresholds time Tv (No), the ECU 10 advances the process to step S190, cancel LCA, and returns to this routine.

In step S182, the ECU 10 transmits the LCA start guidance display command to the display device 70 and starts lane change based on the target lateral velocity vy. Next, in step S184, the ECU 10 determines whether any one of the LCA cancellation conditions (1) to (5) is satisfied. When any one of the LCA cancellation conditions (1) to (5) is satisfied (Yes), the ECU 10 advances the process to step S190, cancel LCA, and returns to this routine. At this time, the ECU 10 transmits the cancel guidance display command for LCA to the display device 70. On the other hand, if any of the LCA cancellation conditions (1) to (5) is not satisfied (No), the ECU 10 advances the process to step S188.

In step S188, the ECU 10 determines whether the own vehicle VH has reached the final target lateral position CL2. When the own vehicle VH reaches the final target lateral position CL2 (Yes), the ECU 10 advances the process to step S195, terminates LCA, and returns to this routine. At this time, the ECU 10 transmits a LCA terminate guidance display command to the display device 70. On the other hand, if the own vehicle VH has not reached the final target lateral position CL2 (No), the ECU 10 returns to the process of step S184.

When the determination of the above-described step S120 is affirmative (Yes), that is, when the rear vehicle VO is exists, the ECU 10 advances the process to step S130 and acquires the relative speed vr and inter-vehicle distance dr with respect to the rear vehicle VO based on the detection result of the external sensor device 40.

Next, in step S140, the ECU 10 sets the threshold time Tv1 to Tv3 for determining the beginning of the lane change and the lateral speed vy1 to vy3 during the lane change by referring to the switching map M based on the relative speed vr and inter-vehicle distance dr with respect to the rear vehicle VO.

In step S150, the ECU 10 determines whether or not a state in which all of LCA execution-permitting conditions (1) to (5) are satisfied continues for the threshold time Tv1, Tv2, Tv3 which is set in step S140. When the determination is affirmative (Yes), the ECU 10 advances the process to step S160. On the other hand, if the determination is negative (No), the ECU 10 advances the process to step S170, cancel LCA, and returns to this routine.

In step S160, the ECU 10 transmits the LCA start guidance display command to the display device 70, and starts lane change based on the lateral speed vy1, vy2, vy3 which is set in step S140. Next, in step S162, the ECU 10 determines whether any one of the LCA cancellation conditions (1) to (5) is satisfied. If any of the cancellation conditions (1) to (5) is satisfied (Yes), the ECU 10 advances the process to step S170, cancel LCA being executed, and returns to this routine. At this time, the ECU 10 transmits the cancel guidance display command for LCA to the display device 70. On the other hand, when any of the cancellation conditions (1) to (5) is not satisfied (No), the ECU 10 advances the process to step S166.

In step S166, the ECU 10 determines whether the own vehicle VH has reached the final target lateral position CL2. When the own vehicle VH reaches the final target lateral position CL2 (Yes), the ECU 10 advances the process to step S175, terminates LCA, and returns to this routine. At this time, the ECU 10 transmits a LCA terminate guidance display command to the display device 70. On the other hand, if the own vehicle VH has not reached the final target lateral position CL2 (No), the ECU 10 returns to the process of step S162.

In the above, the vehicle control device, the vehicle control method and the program according to the at least one embodiment have been described, but the present disclosure is not limited to the above-mentioned at least one embodiment, and various modifications are possible within the range not departing from the object of the present disclosure.

Figure 5:
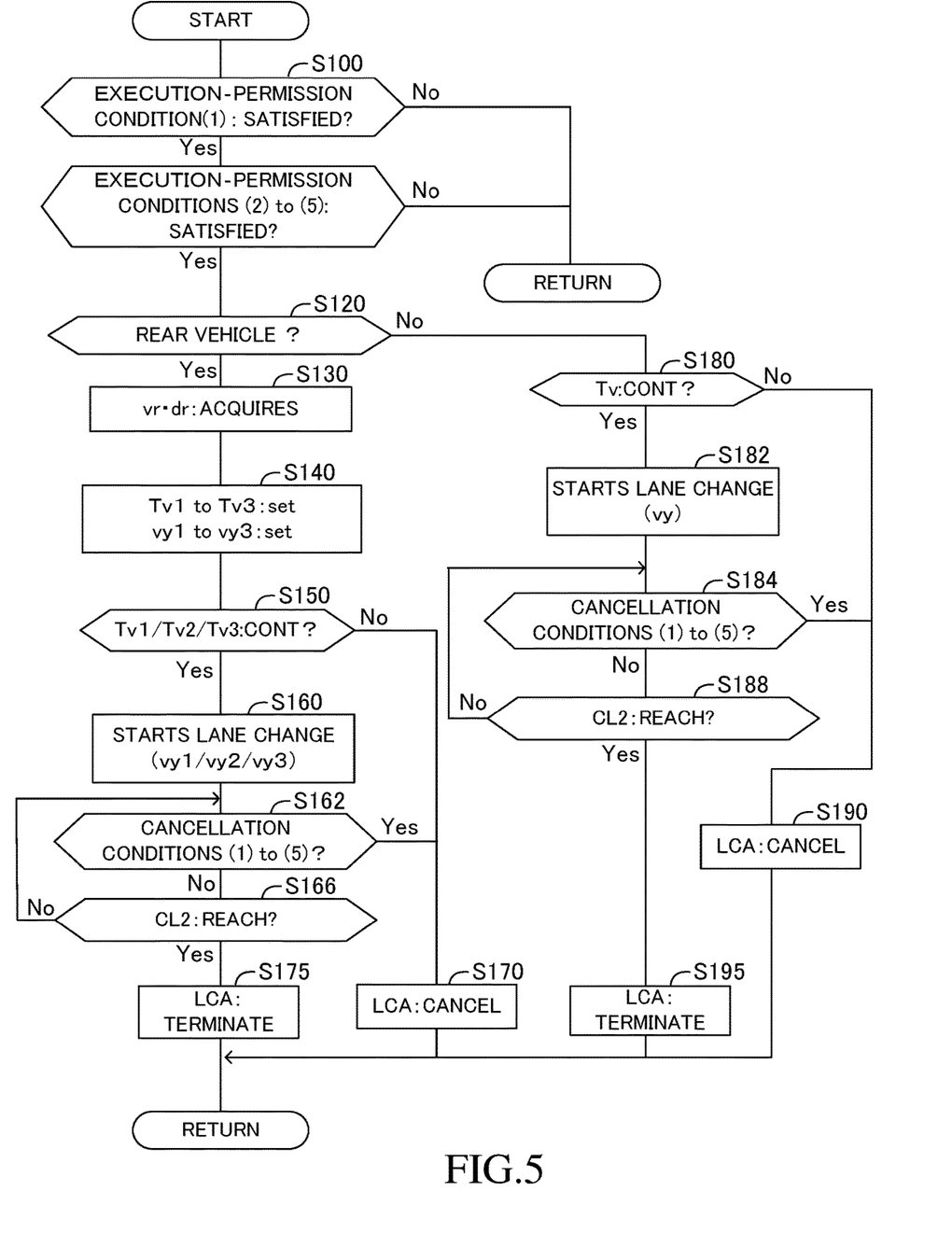
FIG. 5 is a flow chart for explaining a routine of LCA according to the present embodiment.

For example, in the above described embodiment, as shown in FIG. 5, the lateral speed vy1 to vy3 is set in step S140, and the lane change is executed after step S160 based on the lateral speed vy1 to vy3 set in the step S140. However, the lateral speed vy1 to vy3 may be appropriately changed during the lane change by referring to the switching map M in a predetermined cycle after the step S160.

Figure 6:
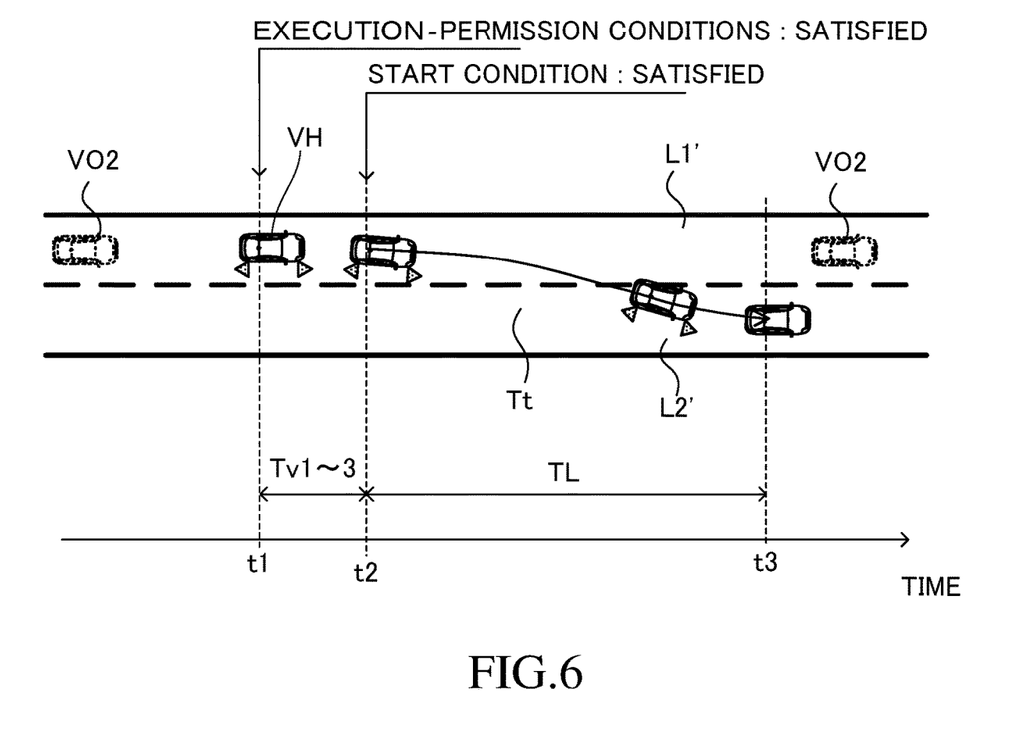
FIG. 6 is a schematic diagram showing an another embodiment.

Further, in the above described embodiment, the object of the interference prevention control has been described as an example of the rear vehicle VO traveling in the target lane L2 which is the lane change destination, but as shown in FIG. 6, when own vehicle VH changes the lane from the overtaking lane L1' to the traveling lane L2', for example, the object of the obstruction prevention control may be the following vehicle VO2 that approaches the overtaking lane L1' from the rear with respect to own vehicle VH. This case also, prior to the abnormal approach of the following vehicle VO2, the lane change of the own vehicle VH can be completed quickly, effectively preventing the following vehicle VO2 from interfering with the travel. Further, the application of the present disclosure can also be applied to the vehicle that automatically performs some or all of the driving operations.

What is claimed is:

1. A vehicle control device configured to execute a lane change assist control for automatically changing a lane from a lane traveling on an own vehicle to a target lane adjacent to the lane,
wherein the vehicle control device is configured to:
obtain a relative distance and a relative speed between the own vehicle and a rear vehicle traveling behind the one vehicle; and
shorten the time from the establishment of the specific condition for permitting the execution of the lane change assist control to the start of the lane change, when the relative distance is shorter and/or a speed of the rear vehicle is higher than a speed of the own vehicle and the relative speed is larger.

2. The vehicle control device according to claim 1,
wherein the vehicle control device is configured to increase a lateral speed which is a moving speed in the lane width direction in which the lane change is being performed, when the relative distance is shorter and/or a speed of the rear vehicle is higher than a speed of the own vehicle and the relative speed is larger.

3. The vehicle control device according to claim 1,
wherein the rear vehicle include a vehicle running on the target lane behind the own vehicle.

4. A vehicle control method which is applied to a vehicle, the vehicle comprising a control device configured to execute a lane change assist control for automatically changing a lane from a lane traveling on an own vehicle to a target lane adjacent to the lane,
wherein the vehicle control method comprising:
obtaining a relative distance and a relative speed between the own vehicle and a rear vehicle traveling behind the one vehicle; and
shortening the time from the establishment of the specific condition for permitting the execution of the lane change assist control to the start of the lane change, when the relative distance is shorter and/or a speed of the rear vehicle is higher than a speed of the own vehicle and the relative speed is larger.

5. A program which is applied to a vehicle, the vehicle comprising a control device configured to execute a lane change assist control for automatically changing a lane from a lane traveling on an own vehicle to a target lane adjacent to the lane,
wherein the program causes an electronic control unit of the vehicle to execute:
obtaining a relative distance and a relative speed between the own vehicle and a rear vehicle traveling behind the one vehicle; and
shortening the time from the establishment of the specific condition for permitting the execution of the lane change assist control to the start of the lane change, when the relative distance is shorter and/or a speed of the rear vehicle is higher than a speed of the own vehicle and the relative speed is larger.

* * * * *